United States Patent Office 3,687,866
Patented Aug. 29, 1972

3,687,866
PROCESS OF PREPARING SYNTHESIS GAS
Constant P. M. Sadée, Brunssum, and Henricus A. A.
Koenders, Geleen, Netherlands, assignors to Stamicarbon N.V., Heerlen, Netherlands
Filed July 30, 1970, Ser. No. 59,390
Int. Cl. C01b 2/14; F02b 75/12
U.S. Cl. 252—373        2 Claims

ABSTRACT OF THE DISCLOSURE

A method for the production of carbon monoxide and hydrogen by the incomplete combustion of methane with oxygen and optionally in the presence of nitrogen is disclosed. The combustion is conducted in an internal engine supplied with a mixture of the three gases, preferably within the proportions of ABCD of FIG. 1.

---

This invention relates to the combustion in a spark-ignition internal-combustion of methane-containing gas mixtures whereby motive power is obtained from the engine together with synthesis gas as an exhaust product.

The concomitant production of motive power and synthesis gas by such a method is well-known, and several procedures have hitherto been described to provide optimum power and gaseous product. The synthesis gas which is a mixture of carbon monoxide and hydrogen is a valuable product and may be used in chemical syntheses. A convenient source of methane-containing gas is natural gas, which depending on the gas field from which it is derived may contain from 65% to 99% by volume of methane, the rest being a mixture containing for example other hydrocarbon gases, carbon dioxide, sulphur-containing gases and nitrogen.

An object of the present invention is to provide a process of preparing synthesis gas by the incomplete combustion of methane in a combustion engine, with a high yield of hydrogen and carbon monoxide and avoidance of the formation of soot.

Another object of the present invention is to provide such a process with avoidance of an undue rate of pressure increase and unduly high pressure during the combustion process, both in starting up and in normal operation of the engine.

Another object of the invention is to provide a process of preparing synthesis gas by incomplete combustion of natural gas in a combustion engine without the necessity of starting the engine on oxygen-enriched air.

The difficulties of operating internal-combustion engines using such feed gas is described for instance in "British Chemical Engineering," 8, No. 6, June 1963, pp. 392–396, Dr. G. A. Karim, where the balance between the heat energy developed during combustion and the incomplete combustion necessary to ensure the presence of CO and $H_2$ in the exhaust is discussed as a function of $O_2/CH_4$ ratio of the input gases. Furthermore with the so-called "dual-fuel" engines, it is stated that the composition of the input needs at start-up should be different from that introduced during the established operation of the engine. For instance such an engine should be started on diesel fuel, which is then gradually replaced by methane or a methane-containing gas until the engine tends to stall, and when this critical point is reached oxygen is admitted at a gradually increasing rate to accelerate combustion until the required feed mixture is obtained. A similar procedure is used in reverse for stopping the engine.

A similar difficulty has been experienced using a spark-ignition internal-combustion engine, as described for example in Paper 42 of the proceedings of the 6th World Petroleum Congress, 1963, pp. 429–437, namely "Product of Synthesis Gas by an Internal-Combustion Engine," T. Yamamoto et al. To prevent flash-back at the start, the engine is started with a mixture of natural gas and air, the air gradually being replaced by oxygen. Furhermore to prevent explosion in the induction supply pipe, it is necessary to supply the natural gas and oxygen separately through different intake manifolds. This in turn results in a difficulty in obtaining adequate mixing of the gas components in the engine cylinders, which limits the practical range of mixing ratios. Thus it has hitherto been desirable to use slow-running engines of the order of 500 to 650 r.p.m. to ensure adequate mixing and also to ensure that sufficient induction time is available to provide maximum power output for any given composition of exhaust gases.

It has now been discovered that if the inlet gases are in a specified range of proportions of methane, oxygen and nitrogen, a spark-ignition engine may be operated on such a mixture to produce optimum energy and synthesis gas as an exhaust product, and furthermore may be run with inlet gases of substantially constant composition from starting up of the engine. Furthermore means are provided according to the invention for ensuring that a gas mixture of constant composition is introduced to the engine. In a further embodiment of the invention, means are provided for introducing the constituent gases as a preformed mixture to the engine without the danger of fires occurring due to backfiring.

A particular advantage of the gas composition of the invention is that they do not have a tendency to form carbonaceous deposits in the engine, and furthermore do not have a tendency to cause engine knocking, and also provide a mixture which burns smoothly in a controlled manner.

The limits of proportions of the gases used according to the invention are based on a triangular graphical representation of the volume percentage of methane, oxygen and nitrogen, and are derived by considering jointly the triangular graphs of FIGS. 1, 2 and 3 of the accompanying drawings.

During the investigation into the explosiveness of mixtures of methane, oxygen and nitrogen which ultimately resulted in the present invention, a number of interesting areas were determined which are typical of such a reaction. These will be expalined with reference to the graphical triangular diagram of FIG. 1.

FIG. 1 is a representation showing (a) a detonation area derived from experiments hereinafter described, (b) an explosion area larger than and including the whole of, the said detonation area, the criterion being that the gases react together, (c) a soot forming area.

The experiments on which FIG. 1 was constructed comprise introducing the gaseous constituents in controlled and specific proportions into a combustion bomb, which are then ignited therein with a spark generated by a spark plug. The rate of increase of pressure was determined for each test.

If in a combustion bomb the reaction $$CH_4 + 2O_2 \rightarrow CO_2 + 2H_2O$$

goes to completion, the theoretical residual pressure after cooling would have to be ⅓ of the initial pressure as otherwise the water resulting from the reaction condenses. Since it is known that the conversion is incomplete the actual residual pressure will be slightly higher. In the areas alongside the stoichiometric ratio of $CH_4$ to $2O_2$, the residual pressure increases, since an excess amount of one of the gases is present.

There is also an area of mixtures in which the residual pressure is higher than the initial pressure. In this area hydrogen is formed instead of water, according to the reaction $2CH_4 + O_2 \rightarrow 2CO + 4H_2$. Theoretically, a doubling of the residual pressure would have to occur for a stoichiometric composition.

On either side of the stoichiometric line for the reaction producing $CO_2 + 2H_2O$, there is a virtually triangular explosion area of mixtures of $CH_4$, $N_2$ and $O_2$. Within this area, some important partial areas can be distinguished, namely:

(a) the area in which the maximum rate of pressure increase is over 4000 bars/sec., termed the detonation area;
(b) an area lying alongside the stoichiometric line for the reaction towards $CO_2 + 2H_2O$ and covering part of the detonation area, in which $H_2$ and CO are produced. The stoichiometric composition for this reaction is outside the explosion area, however, so that the expected doubling of the pressure cannot occur; and
(c) a small area on the edge of the explosion area, where the $N_2$ content is below 25% and in which soot is formed in addition to $H_2$ and CO.

Figure 1:
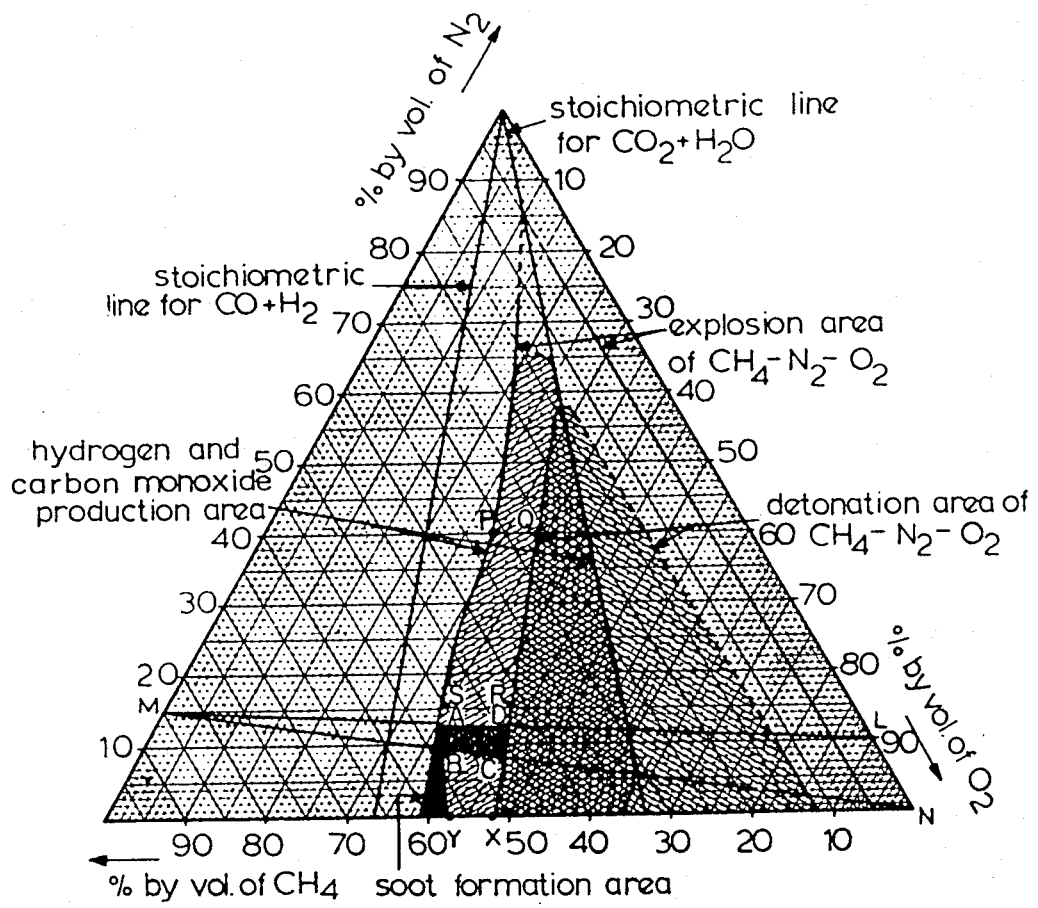
Figure 2:
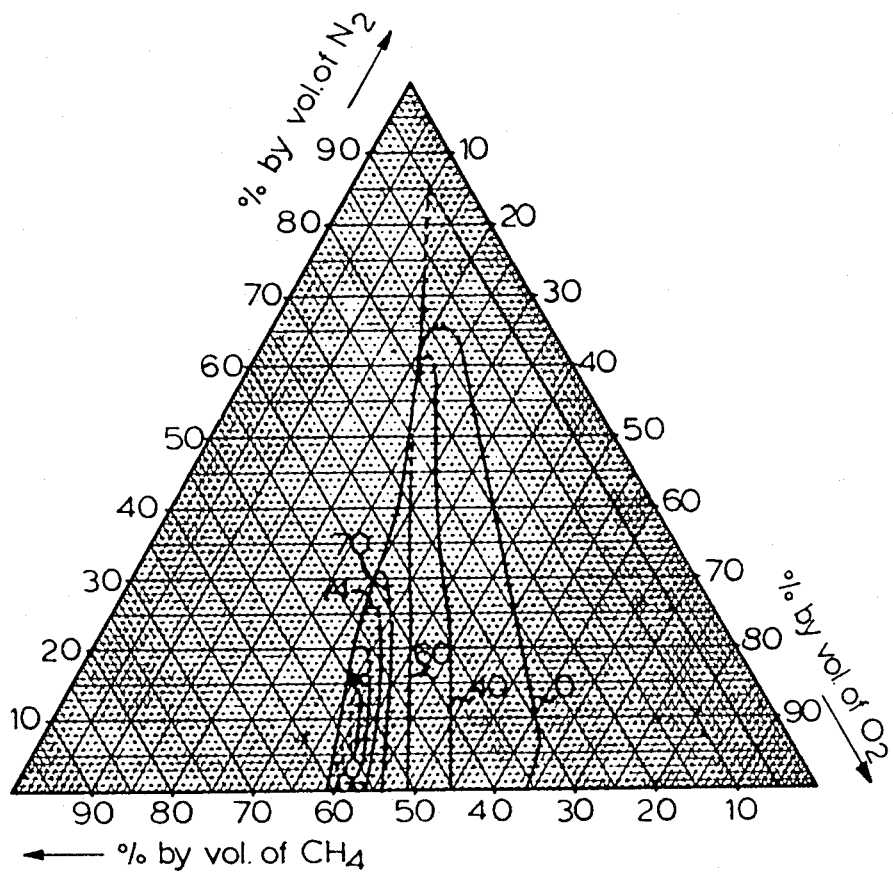
FIG. 2 shows lines of equal hydrogen production for various compositions in the said combustion bomb, expressed as a percentage of theoretical hydrogen production according to the equation hereinbefore set forth.
Figure 3:
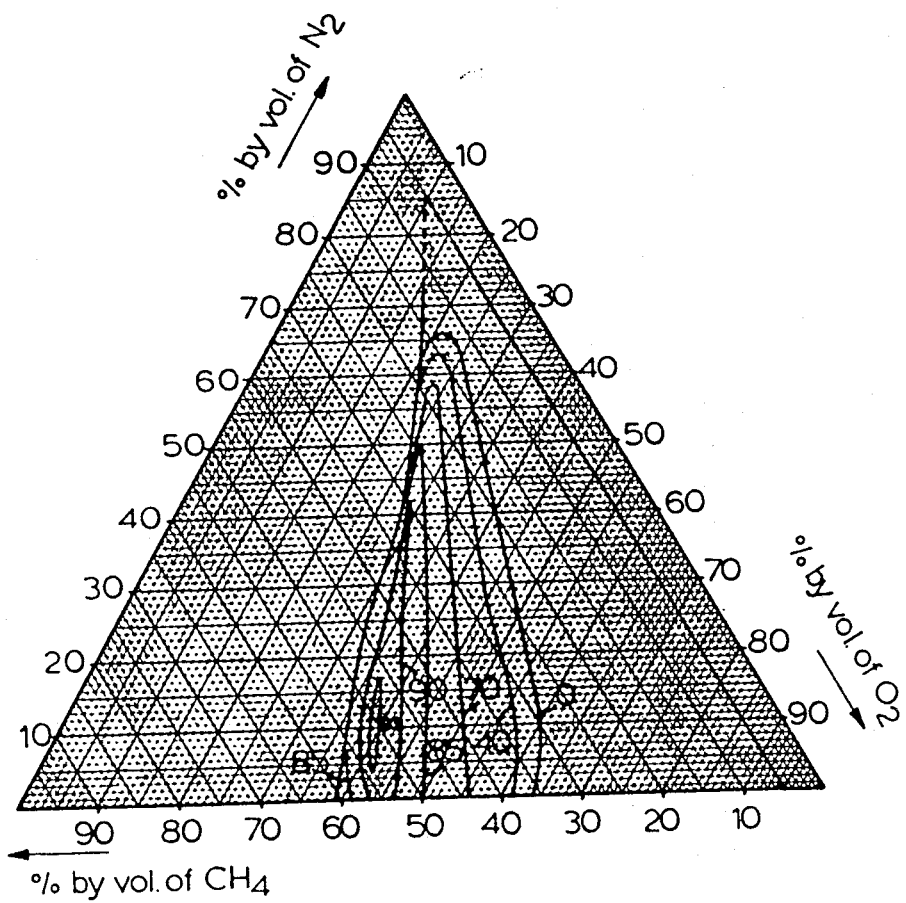
FIG. 3 shows lines of equal carbon monoxide production in the said combustion bomb, expressed as a percentage of theoretical carbon monoxide production according to the equation hereinbefore set forth.

It will be noted that in FIGS. 2 and 3 the areas corresponding to a minimum of 60% efficiency of hydrogen production and a minimum of 85% efficiency for the CO production, respectively are within the explosion (reaction) area of FIG. 1 but are outside the detonation and soot-forming areas. In marked contrast to the teachings of the prior art, the FIGS. 2 and 3 show that the maximum yields of both products do not lie on the $CH_4$-$O_2$ line, but rather higher. To obtain an optimum yield, it is thus apparently preferable to have on the order of about 14% of $N_2$ in the feed stream. However, this $N_2$ content is not very critical, since, as shown in FIGS. 2 and 3, the lines of constant $H_2$ and CO yield are both stretched and point towards the top of the triangle, the top representing 100% nitrogen.

The results of the experiments were confirmed by running an air-cooled four-stroke one-cylinder spark-ignition engine capable of 1.1 kw. when run on gasoline fuel.

The compositions according to the invention therefore are represented by a common area for the said minimum desired $H_2$ and CO efficiencies, and is represented by the area PQXY in FIG. 1. Particularly preferred compositions are those within the area SRXY, which are predominantly areas of 80% and 93% $H_2$ and CO efficiency respectively.

The invention therefore consists in a method of obtaining an exhaust gas comprising carbon monoxide and hydrogen by operating a spark-ignition internal-combustion engine using a methane-containing gas as an engine fuel, which method is characterized in that the engine is run on a premixed gaseous fuel of substantially constant composition and comprising methane, oxygen and nitrogen, the proportions of the said methane, oxygen and nitrogen being within the ranges of an area in a triangular plot limited by the following four values by volume,

| $CH_4$, percent | 57.5 | 32 | 26 | 52 |
| $O_2$, percent | 42.5 | 28 | 34 | 48 |
| $N_2$, percent | 0 | 40 | 40 | 0 |

Preferred compositions consist of the following four values by volume,

| $CH_4$, percent | 57.5 | 50 | 42 | 52 |
| $O_2$, percent | 42.5 | 35 | 43 | 48 |
| $N_2$, percent | 0 | 15 | 15 | 0 |

As stated for example in Arbeitsblatt Nr. 161 (July 1967), Zusammensetzung von Erdgasen verschiedener Vorkommen, in the German periodical Gas Wärme International, 16, 397 (1967), natural gas from the Groningen field contains 81.3% methane, 14.4% nitrogen and the balance other constituents. Compositions according to the invention obtained by mixing Groningen gas with (a) pure oxygen or (b) commercial (90%) oxygen of technical grade, are shown by lines MN and ML respectively. Compositions according to the invention thus obtainable are shown in area ABCD in FIG. 1, limited by the following percentage volumes:

| $CH_4$, percent | 51 | 43.5 | 46.5 | 53 |
| $O_2$, percent | 36 | 44 | 45.5 | 37.5 |
| $N_2$, percent | 13 | 12.5 | 8 | 9.5 |

Consequently, it is an important advantage of the method according to the present invention that a crude, $N_2$-containing natural gas, for instance of the type found in Groningen, and/or of technically pure oxygen can be used. In addition, the mechanical energy produced by the engine can be used to raise the pressure of the resulting synthesis gas.

In a preferred method of operation of a spark-ignition engine according to the invention with a gas of substantially constant composition the gases may be mixed outside the engine, and the proportions of gas constituents in the mixture maintained at a constant value by the use of one or more so-called "critical orifices" in association with a pressure regulating device installed between the critical orifice(s) and the engine, and responsive to back pressures from the engine. Such orifices have the property of delivering a flow of gas at a sonic velocity provided the pressure ratio immediately after and before the orifice is at a minimum critical value. Such orifices are described for example in Perry's Chemical Engineers Handbook, McGraw-Hill Book Company, 4th edition 1963, pages 5–9/10.

Furthermore a flame extinguishing device may be inserted between the said pressure regulator and the engine whereby the possibility of fire occurring due to back-firing is mitigated. Furthermore, using the gas compositions according to the invention, the engine may be run at relatively high speeds, preferably 2,000 r.p.m. or more using premixed gases, without loss of efficiency. Such speeds are higher than has hitherto been possible in such applications.

An arrangement for delivering a gas of constant composition to a spark-ignition engine using critical orifices, and incorporating a flame-extinguishing device according to the invention is hereinafter described and illustrated in FIG. 4 of the accompanying drawings; which is a schematic representation of the arrangement.

Two gas sources 1 and 2 are provided for supplying nitrogen-containing natural gas and technically pure oxygen respectively, and in internal combustion engine 3 for effecting the required oxidation. A mixing unit A and a safety unit B are interposed successively between the said engine 3 and the said gas sources 1 and 2.

Mixing unit A ensures a constant supply of the two gaseous starting components under all conditions, and hence a constant mixing ratio thereof. The mixing unit is suitably arranged as follows: each of the gas lines 31 and 32, for conveying gas derived from the sources 1 and 2 respectively, successively and respectively incorporates a reducing valve, 41 and 42, a needle valve, 51 and 52, the passage of gas through which is controlled by the pressure drop over a pressure-difference detector, 61 and 62 arranged across a measuring flange of the critical orifice type, 71 and 72. (The use of such critical orifices in gas supply systems is known.) The pressure drop over the critical orifice is greater than the so-called critical pressure drop, so that the passage of gas through the critical orifice is proportional to the absolute pressure in front of the flange. With a given adjustment of the critical orifice, the amount allowed to pass therethrough remains constant.

Each of the two lines 31 and 32 also contains a rotating flow meter, 81 and 82 respectively. The two lines 31 and 32 from the methane and oxygen supply join to form line 4 which is connected to a mixing chamber 5. The mixing chamber 5 is filled with inert particulate matter, e.g. glass beads or metal shavings, to effect intimate mixing of the gases. The free space in the mixing chamber 5 is comparatively small. The amount of gas flowing through each of the lines 31 and 32 is adjusted upstream from each critical orifice, so that, if the temperature is kept constant, the amount of gas passing through the mixing system will be independent of the conditions downstream from the critical orifice as long as the pressure drop remains above the critical value. Thus considering mixing unit A, a mixture of constant composition can be obtained which does not change with changing engine conditions such as load, speed and initial pressure, as long as the pressure drop over the critical orifice does not fall below a predetermined value.

The safety unit B provides optimum safety both for mixing unit A and engine 3. It is impossible for the gases to flow back to the sources 1 and 2 due to closure of valves 51 and 52 respectively. The safety unit comprises an overpressure valve 7 and a back-pressure regulator 8 positioned successively in the conduit 6 between the mixing chamber 5 and the engine 3. (A suitable back-pressure regulator having a fast response to pressure changes is Model 10 BP made by Fairchild Hiller.) A flame extinguisher 10, having valves 9 and 15 on either side, is arranged upstream from the engine 3. The term "flame extinguisher" as used here denotes a device which, upon a sudden rise of the temperature caused by a process, removes the heat so rapidly that the phenomenon does not increase, but in fact decreases.

The flame extinguisher 10 is preferably filled wholly or partly with glass beads or metal shavings, which immediately extinguish any backfiring explosions. This filling material also promotes the mixing of the gases. The free volume inside the flame extinguisher is made relatively large, so that at the same time this device serves as a buffer vessel for smoothing out pressure pulses.

In the line section between the slide valve 15 and the flame extinguisher 10 there is a rupture plate 11 which is responsive to an overpressure. The amount of this overpressure depends on the chosen charging pressure of the engine 3.

The engine 3 is coupled mechanically to a device for the consumption of energy, e.g. an electricity generator and/or a compressor (not shown). The drawing shows a hydraulic brake 12 used for experimental purposes. In operation the torque of the hydraulic brake is overcome by the engine, and measured by gauge 13, hence the engine speed can be controlled and measured. The combustion gases comprising hydrogen and carbon monoxide leaving the engine are discharged through an exhaust silencer 14 to be used elsewhere as starting materials for further processes.

As will be understood by one skilled in the art, any desired number of gaseous components may be fed to the mixing chamber through additional lines connected in the manner described.

Figure 4:
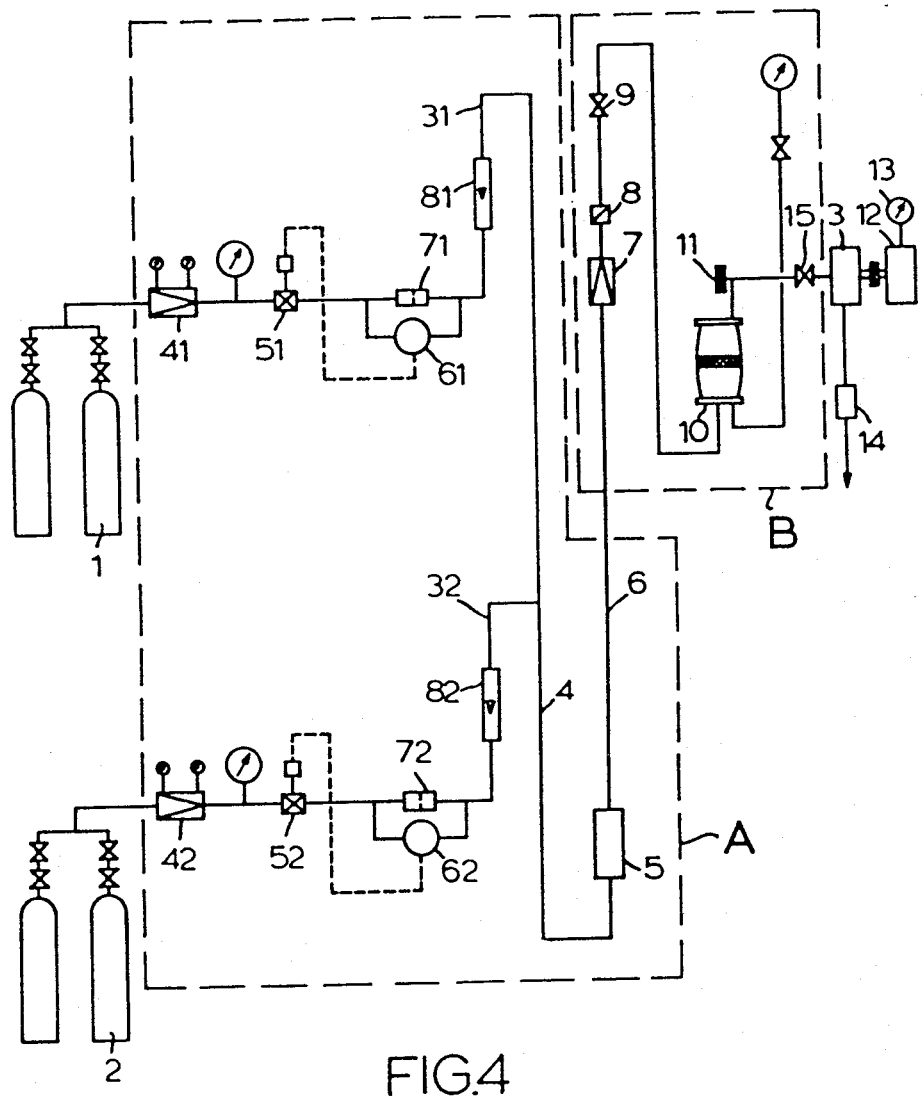

To illustrate the ability of spark-ignition engines to run at high speeds using gas compositions according to the invention, the following example is provided:

Natural methane and pure oxygen of technical grade were mixed in a ratio of 55 to 45% by volume, in a mixing unit hereinbefore described and illustrated in FIG. 4 of the accompanying drawing. As described, means for preventing explosion of methane and oxygen in the inlet line of the engine were provided. The mixture was induced into the cylinder of a 82-ml. one-cylinder spark-ignition engine. The engine had been previously measured and found to develop 1.1 kw. when running at 1,000 to 3,600 r.p.m. on a mixture of air and gasoline. The air-cooled engine worked on the four-stroke cycle and had a compression ratio of 7:1.

The compression ratio, the induction pressure, the pressure at which the resulting gas is delivered, the ignition timing and the moments of opening and closing of the inlet and outlet valves could be varied within limits.

The engine received a gas mixture of constant composition within the area defined by points ABCD of FIG. 1, at a charging pressure of 1.2 bars.

When the natural methane was used, the speed of the engine was carefully controlled to maintain a minimum speed of at least 2,000 r.p.m. In order to accomplish this the engine shaft was coupled to a hydraulic brake, by means of which both the power output and the speed could be controlled and measured. The engine was started up and continued to run smoothly, developing a mechanical output of 1.5 kw.

The composition of the exhaust gas was constantly measured and found to contain the following:

| | Percent by volume |
|---|---|
| $CO$ | 33.5 |
| $CO_2$ | 3.3 |
| $N_2$ | 7.1 |
| $H_2$ | 53.2 |
| $CH_4$ | 2.0 |
| $O_2$ | 0.9 |

The gas composition thus produced is not substantially different from the gas composition obtained by the partial noncatalytic oxidation of methane (i.e. not in a combustion engine). It is to be noted that the $CO_2$ content of the resulting combustion products is considerably lower than that obtained in other methane conversion processes. If it is desired finally to obtain hydrogen as a final product, the process as described in this example may be followed up by the usual steam conversion of CO, according to the reaction $CO+H_2O \rightarrow H_2+CO_2$, so that each CO molecule releases a further $H_2$ molecule.

By the use of this high-speed, highly loaded engine, about 100 m.³ N.T.P. of synthesis gas per hour was produced per litre of cylinder volume, a figure which is 20 times as high as the production reached by the prior art process hereinbefore described. The pressure of the synthesis gas produced was about 1900 mm. Hg, which was above atmospheric pressure.

Unlike an engine consuming gasoline, no dilution of the lubricating oil in the crankcase of the engine was observed. Reasons for this were attributed to the partial oxidation of natural gas under the conditions described, which results in the reactants in the cylinder being of a purely gaseous nature only.

Further, since a $CH_4/O_2$ mixing ratio is used at which there is no soot formation, no fouling whatever of spark plugs and valves was observed, and the lubricating oil in the crankcase remained exceptionally clean.

According to the present invention, it is now possible to adjust the volume ratios of the gas components methane, oxygen and nitrogen to be fed to the combustion engine in order that optimum operating conditions are achieved. In this manner the following improved results are realized:

(1) the partial oxidation of the methane can take place in an area in which both violent ignitions and high ignition pressure are avoided;
(2) the highest possible $H_2$ and CO production efficiencies are obtained;
(3) soot formation is avoided; and
(4) the engine can be started and operated normally on a single gas mixture.

We claim:

1. A method of obtaining a gas comprising carbon monoxide and hydrogen by operating a spark-ignition internal combustion engine using a preformed homogeneous mixture of impure oxygen, methane and nitrogen, said mixture having a substantially constant composition, characterized in that said mixture has a composition within area ABCD of FIG. 1, wherein A, B, C and D having the following values by volume:

|   | Percent | | |
|---|---|---|---|
|   | $N_2$ | $O_2$ | $CH_4$ |
| A | 13 | 36 | 51 |
| B | 9.5 | 37.5 | 53 |
| C | 8 | 45.5 | 46.5 |
| D | 12.5 | 44 | 43.5 | and that engine has a speed of at least 2,000 r.p.m.

2. A method of obtaining a gas comprising carbon monoxide and hydrogen according to claim 1, wherein said gas mixture is used for starting said engine.

References Cited

UNITED STATES PATENTS

| 2,578,475 | 12/1951 | Hirsch et al. | 48—196 |
| 3,283,749 | 11/1966 | Hiratsuka et al. | 48—212 X |
| 1,926,170 | 9/1933 | Oberfell et al. | 48—196 |
| 2,591,687 | 4/1952 | Eastman et al. | 48—196 |
| 2,846,297 | 8/1958 | Herwig | 48—196 |

JOSEPH SCOVRONEK, Primary Examiner

U.S. Cl. X.R.

48—196, 196 FM, 212, DIG 8; 123—1 A; 252—372